3,105,797
BIS(LOWER ALKYL-THIO-CARBAMOYL)-HYDRAZINE DERIVATIVES FOR REGULATING GONADOTROPHIN
George Edward Paget and Arthur Leonard Walpole, Macclesfield, England, assignors to Imperial Chemical Industries Limited, London, England, a corporation of Great Britain
No Drawing. Filed May 26, 1960, Ser. No. 31,811
Claims priority, application Great Britain June 17, 1959
7 Claims. (Cl. 167—74)

This invention relates to compositions of matter and more particularly it relates to pharmaceutical and veterinary compositions which are useful in the modification of the endocrine status in man or in animals.

According to the invention we provide pharmaceutical and veterinary compositions which are suitable for use in man or in animals and which comprise as active ingredient at least one compound selected from the group consisting of $N^1:N^2$-bis(methylthiocarbamoyl)-hydrazine, $N^1:N^2$-bis(ethylthiocarbamoyl)hydrazine, $N^1:N^2$-bis(allylthiocarbamoyl)hydrazine and $N^1$-methylthiocarbamoyl-$N^2$-allylthiocarbamoylhydrazine, in admixture with non-toxic, pharmaceutically-acceptable inert diluents or carriers therefor.

The pharmaceutical and veterinary compositions of this invention may be in a form suitable for oral use or for parenteral use. Oral compositions may be for example in the form of tablets, capsules or pills, solutions or suspensions in water or in non-toxic organic solvent media, dispersible powders suitable for the preparation of liquid suspensions, mixtures with animal foodstuffs or premixes suitable for addition to animal foodstuffs. The said premixes preferably contain between 0.1% and 25% by weight of active ingredient and the said mixtures with animal foodstuffs preferably contain between 0.001% and 1% by weight of active ingredient. Compositions for parenteral use may be for example in the form of solutions or suspensions in water or in non-toxic organic solvent media, or dispersible powders suitable for the preparation of liquid suspensions.

The pharmaceutical and veterinary compositions may contain excipients as are known to the art to be useful or desirable in the preparation of such compositions for example wetting agents, dispersing agents, suspending agents, lubricating agents, sweetening agents, flavouring agents or colouring agents.

The oral compositions for use in man are preferably in the form of tablets wherein the inert diluent or carrier is for example maize starch, lactose or alginic acid. There may also be present wetting agents for example the alkali metal salts of sulphonated dialkylnaphthalenes for example the sodium salt of sulphonated di-isopropylnaphthalene and lubricating agents for example magnesium stearate. The said tablets preferably contain between 40% and 99% by weight of active ingredient and more particularly between 70% and 85% by weight of active ingredient. The said tablets may contain between about 50 mg. and about 1000 mg. of active ingredient.

The veterinary compositions for oral use may be in the form of powders suitable for admixture with foodstuffs. The said powders may contain the active ingredient in admixture with non-toxic diluents or carriers for example talc, kaolin, chalk, lactose, urea, corn meal, ground oyster shells, distillers dried grains and edible vegetable substances for example commercial animal feeds.

Suitable wetting and/or dispersing agents for use in the compositions of the invention may be for example condensation products of ethylene oxide with alkylphenols for example octylcresol for example the condensation product of octylcresol with 7–10 molecular proportions of ethylene oxide and condensation products of ethylene oxide with fatty alcohols for example cetyl alcohol.

A suitable suspending agent may be for example sodium carboxymethylcellulose and a suitable lubricating agent may be for example magnesium stearate.

Suitable non-toxic solvents for use in the present composition intended for oral or parenteral administration are propylene glycol and glycerol formal.

A preferred compound for use as the active ingredient in the compositions of the invention is $N^1:N^2$-bis(allylthiocarbamoyl)hydrazine.

As stated above, the pharmaceutical and veterinary compositions of the invention possess valuable properties and they may be used for the management of the sexual cycle and aberrations thereof.

Tablets containing $N^1:N^2$-bis(allylthiocarbamoyl)hydrazine have been administered by mouth to two postmenopausal women. The dosage rate in case 1 was 400 mg. per day during days 1–8, 800 mg. per day during days 9–23, 1200 mg. per day during days 24–30 and 1600 mg. per day during days 31–39. The dosage rate in case 2 was 500 mg. per day during days 1–7, 1000 mg. per day during days 8–14 and 1500 mg. on the 15th day. In both cases, within 7 days of the start of dosing, there was a fall in the excretion of gonadotrophin in the urine to a value of between one third and one quarter of the level prior to treatment.

The invention is illustrated but not limited by the following examples in which the parts are by weight.

*Example 1*

300 parts of talc are charged to a suitable mixer and 100 parts of $N^1:N^2$-bis(allylthiocarbamoyl)hydrazine are sprinkled in gradually and mixing is continued until an even mixture is obtained. There is thus obtained a premix which may be added to a suitable foodstuff to provide material suitable for oral administration to animals.

*Example 2*

A premix is prepared by gradually adding 90 parts of corn cob meal to 10 parts of $N^1:N^2$-bis(allylthiocarbamoyl)hydrazine with stirring. After the addition the mixture is transferred to a conventional tumbler mixer which is allowed to operate until a homogeneous mix is obtained. There is thus obtained a premix which can be added to foodstuff to provide material suitable for oral administration to animals.

*Example 3*

1980 parts of food mash are pasted with a solution of 0.4 part of $N^1:N^2$-bis(allylthiocarbamoyl)hydrazine in 1200 parts of acetone and the mixture is stirred mechanically for two hours. The mixture is dried at 40° C. and there is thus obtained a food mash suitable for oral administration to animals.

*Example 4*

50 parts of $N^1:N^2$-bis(allylthiocarbamoyl)hydrazine are ball-milled for 20 hours in a solution of 0.5 part of acetyl alcohol polyethylene oxide condensate and 1 part of sodium carboxymethylcellulose in 190 parts of water. There is thus obtained a suspension which can be diluted with water to provide a preparation suitable for oral administration to animals.

*Example 5*

10 parts of $N^1:N^2$-bis(allylthiocarbamoyl)hydrazine and 50 parts of acetyl alcohol polyethylene oxide condensate are dissolved in 500 parts of N:N-diethylacetamide. There is thus obtained a solution which can be diluted with water to provide oral preparations suitable for administration to animals.

*Example 6*

500 parts of $N^1:N^2$-bis(allylthiocarbamoyl)hydrazine, 80 parts of maize starch, 2 parts of the sodium salt of sulphonated di-isopropylnaphthalene and 10 parts of alginic acid are granulated with 550 parts of 10% aqueous maize starch paste. The granules are dried at 40° C. and are then mixed with 3 parts of magnesium stearate in a suitable blender. They are then compressed into tablets of 650 mg., containing 500 mg. of $N^1:N^2$-bis-(allylthiocarbamoyl)hydrazine, which are suitable for oral administration to man or to animals.

*Example 7*

20 parts of sucrose, 0.5 part of a polyoxyethylene sorbitan mono-oleate, 1 part of sodium carboxymethylcellulose, 0.1 part of soluble saccharin and 0.001 part of Amaranth B.P.C. (a magenta-red colouring matter) are dissolved in 85 parts of hot water and the solution is then cooled. 14.3 parts of $N^1:N^2$-bis(allylthiocarbamoyl)hydrazine in the form of a fine powder are then added followed by 0.2 part of oil of peppermint and the mixture is homogenised to give an aqueous suspension suitable for oral administration to man.

*Example 8*

A composition is prepared according to the following recipe:

| | Percent w./w. |
|---|---|
| $N^1:N^2$-bis(allylthiocarbamoyl)hydrazine | 18.3 |
| Granulated sugar | 80.2 |
| Powdered traggacanth | 1.0 |
| Cetyl alcohol polyethylene oxide condensate | 0.1 |
| Methyl p-hydroxybenzoate | 0.2 |
| Propyl p-hydroxybenzoate | 0.02 |
| Oil of peppermint | 0.2 |

The above ingredients are mixed with sufficient 90% v./v. ethanol to give a mass suitable for granulation.

The damp mixture is passed through a suitable sieve and the granules so obtained are dried at 50° C. The granular product is added to water and there is thus obtained an aqueous suspension suitable for oral administration to man.

*Example 9*

$N^1$-$N^2$-bis(allylthiocarbamoyl)hydrazine is sterilised by dry heating at 150° C. during 1 hour and 20 parts of this sterilised material is then charged into a sterile ball-mill. 80 parts of a previously sterilised aqueous medium containing 0.05 part of the product obtained from the condensation of octylcresol with about 9 molecular proportions of ethylene oxide, and 1 part of sodium carboxymethylcellulose is added to the sterile ball-mill and the mixture is then milled until the maximum size of substantially all the particles does not exceed 20 microns. The aqueous suspension so obtained is suitable for intramuscular or subcutaneous administration to man or animals.

*Example 10*

500 parts of $N^1:N^2$-bis(allylthiocarbamoyl)hydrazine, 12 parts of maize starch, 2 parts of sodium lauryl sulphate and 28.5 parts of alginic acid are granulated with 550 parts of 10% aqueous maize starch paste. The granules are dried at 40° C. and are then mixed with 2.5 parts of magnesium stearate in a suitable blender. They are then compressed into tablets containing 100 mg. or 500 mg. of active ingredient which are suitable for oral administration to man or to animals.

What we claim is:

1. Pharmaceutical and veterinary compositions which comprise as active ingredient at least one compound selected from the group consisting of $N^1:N^2$-bis(methylthiocarbamoyl)hydrazine, $N^1:N^2$-bis(ethylthiocarbamoyl)hydrazine, $N^1:N^2$-bis(allylthiocarbamoyl)hydrazine and $N^1$-methylthiocarbamoyl-$N^2$-allylthiocarbamoylhydrazine, in admixture with a non-toxic, pharmaceutically-acceptable inert carrier therefor.

2. Compositions as claimed in claim 1 in the form of an animal food premix wherein there is present between 0.1% and 25% by weight of active ingredient.

3. Compositions as claimed in claim 1 wherein the carrier is an animal foodstuff having admixed therein between 0.001% and 1% by weight of active ingredient.

4. Compositions as claimed in claim 1 wherein the active ingredient is $N^1:N^2$-bis(allylthiocarbamoyl)hydrazine.

5. Compositions as claimed in claim 1 which are in the form of tablets containing between 40% and 99% by weight of active ingredient.

6. Tablet compositions as claimed in claim 5 wherein there is present between about 50 mg. and about 1000 mg. of active ingredient.

7. Process for the reduction of gonadotrophin excretion, in man and animals which comprises administering thereto an effective amount of compound selected from the group consisting of $N^1:N^2$-bis(methylthiocarbamoyl)hydrazine, $N^1:N^2$-bis(ethylthiocarbamoyl)hydrazine, $N^1:N^2$-bis(allylthiocarbamoyl)hydrazine and $N^1$-methylthiocarbamoyl-$N^2$-allylthiocarbamoylhydrazine.

References Cited in the file of this patent

UNITED STATES PATENTS 2,966,495  Song  Dec. 27, 1960

OTHER REFERENCES

Freund et al.: Berichte, 28, 948, 1895.